(12) United States Patent
Mimouni et al.

(10) Patent No.: US 8,243,574 B2
(45) Date of Patent: Aug. 14, 2012

(54) METHOD AND SYSTEM FOR READING HIGH DENSITY OPTICAL INFORMATION

(75) Inventors: Salim Mimouni, Grenoble (FR); Fabien Laulagnet, Fontaine (FR)

(73) Assignee: Commissariat a l'Energie Atomique, Paris (FR)

( * ) Notice: Subject to any disclaimer, the term of this patent is extended or adjusted under 35 U.S.C. 154(b) by 5 days.

(21) Appl. No.: 12/598,166

(22) PCT Filed: Apr. 30, 2008

(86) PCT No.: PCT/EP2008/055322
§ 371 (c)(1),
(2), (4) Date: Feb. 2, 2010

(87) PCT Pub. No.: WO2008/135485
PCT Pub. Date: Nov. 13, 2008

(65) Prior Publication Data
US 2010/0149948 A1 Jun. 17, 2010

(30) Foreign Application Priority Data
May 4, 2007 (FR) ...................................... 07 03247

(51) Int. Cl.
*G11B 7/135* (2012.01)
(52) U.S. Cl. ..................... 369/112.16; 369/101
(58) Field of Classification Search .................. None
See application file for complete search history.

(56) References Cited

U.S. PATENT DOCUMENTS

| | | | | |
|---|---|---|---|---|
| 4,177,298 A | * | 12/1979 | Shigeta et al. | 438/547 |
| 5,049,462 A | * | 9/1991 | Funhoff et al. | 430/21 |
| 5,070,494 A | * | 12/1991 | Emoto et al. | 369/112.17 |
| 5,136,424 A | * | 8/1992 | Cox et al. | 359/394 |
| 6,265,708 B1 | * | 7/2001 | Tanaka et al. | 250/216 |
| 6,969,472 B2 | * | 11/2005 | Vezenov et al. | 216/24 |
| 7,272,079 B2 | * | 9/2007 | Challener | 369/13.17 |
| 7,606,132 B2 | * | 10/2009 | Song et al. | 369/101 |
| 2002/0168592 A1 | * | 11/2002 | Vezenov et al. | 430/320 |
| 2004/0062503 A1 | * | 4/2004 | Challener | 385/129 |
| 2004/0194119 A1 | * | 9/2004 | Miyanishi et al. | 720/659 |
| 2005/0226129 A1 | * | 10/2005 | Carr | 369/125 |
| 2005/0289576 A1 | * | 12/2005 | Challener | 720/658 |
| 2010/0149948 A1 | * | 6/2010 | Mimouni et al. | 369/110.01 |

FOREIGN PATENT DOCUMENTS

| EP | 1 455 351 A | 9/2004 |
|---|---|---|
| WO | WO 2005/031730 A | 4/2005 |

* cited by examiner

*Primary Examiner* — Peter Vincent Agustin
(74) *Attorney, Agent, or Firm* — LaRiviere, Grubman & Payne, LLP

(57) ABSTRACT

The invention relates to the writing and optical reading of high-density information. The higher energy density at the center of the reading laser beam is used for modifying the energy structure of an active layer in such a way as to make it capable of bearing surface plasmons. The coupling of the laser beam and the active layer thus modified can then excite surface plasmons in an interface between a dielectric layer and the active layer. These surface plasmons are disturbed by physical marks having very small dimensions and written in the optical storage medium; these disturbances generate a remote-field optical response which can be detected by a detector. The operation is carried out in super-resolution, the surface plasmons being generated only at the center of the laser beam and not at the periphery. It is therefore possible to write and to read again marks having dimensions of size smaller than the theoretical resolution of the optical reading system.

11 Claims, 2 Drawing Sheets

METHOD AND SYSTEM FOR READING HIGH DENSITY OPTICAL INFORMATION

PRIORITY CLAIM

This application claims priority to PCT Patent Application Number PCT/EP2008/055322, entitled Method and System for Reading High Density Optical Information, filed on Apr. 30, 2008.

FIELD OF THE INVENTION

The invention relates to the writing and optical reading of high-density information.

BACKGROUND OF THE INVENTION

When it is sought to increase the density of information written on an optical disk, this is generally limited by the performance of the device for reading the information. The basic principle is that physical information written on the disk can only be read with great difficulty if its dimensions are less than the resolution limit of the optical system which will be used for reading that information. Typically, when reading with a red laser of wavelength 650 nm and a numerical aperture of 0.6, it is not normally possible to hope to correctly read information having dimensions less than 0.4 micrometer, or at the least 0.3 micrometer. With a blue laser of wavelength 400 nm, it will not be possible to read marks having dimensions less than 0.2 or 0.3 micrometers.

However, method called super-resolution methods have been envisaged for reading information whose physical dimensions are smaller, or even very much smaller, than the wavelength. These methods are based on the non-linear optical properties of certain materials. Non-linear properties is understood to mean the fact that certain optical properties of the material change as a function of the intensity of the light which they receive. The direct causer of this change can be the thermal heating due to this illumination: it is the reading laser itself which will locally modify the optical properties of the material by thermal, optical, thermo-optical and/or optoelectronic effects on dimensions smaller than the dimension of the reading laser spot; because of the change of property, an item of optical information present in this very small volume becomes detectable whereas it would not have been detectable without this change.

The phenomenon used is principally based on two properties of the reading laser that will be used:
  on the one hand, the laser is focused very strongly in order to exhibit an extremely small cross-section (of the order of the wavelength) but whose power distribution is Gaussian, very strong at its center and very attenuated at the periphery,
  and, on the other hand, a reading laser power is chosen such that the power density over a small part of the cross-section, at the center of the beam, significantly modifies an optical property of the layer, whilst the power density outside of this small portion of the cross-section does not significantly modify this optical property; the optical property is modified in a way tending to allow the reading of an item of information which would not be readable without this modification.

For example, the optical property which changes is an increase in the optical transmission in the case where the reading of a bit constituted by a physical mark formed on the optical disk necessitates a transmission of the laser beam up to this physical mark. The non-linear layer is then interposed in the path of the beam towards the physical mark. The center of the laser beam will be able to pass through the layer up to the mark, because on passing through the layer the intensity of the incident light will make it more transparent, whilst the periphery of the beam will not pass through because it does not sufficiently modify the optical indices of the layer in order to make it more transparent. Everything happens as if a beam focused onto a much smaller diameter than would be allowed by its wavelength had been used.

Various theoretical proposals have been formulated in order to implement these principles, but none of them has given rise to industrial development. The patent U.S. Pat. No. 5,153,873 reviews the theory. In the patent EP 1492 101 there is described a super-resolution layer constituted of nanoparticles of metal, accompanied by a specific stack containing a phase changing material.

SUMMARY OF THE INVENTION

According to the invention, it was found that it was possible to use another phenomenon to obtain a super-resolution effect. The idea is to use the higher energy density at the center of the laser beam in order to modify the energy structure of an active layer in such a way as to make it capable of supporting surface plasmons. The coupling of the laser beam and the active layer thus modified can then excite surface plasmons in an interface between a dielectric layer and the active layer.

It is recalled that the surface plasmons are near-field waves which arise at an interface between certain materials and a dielectric layer, in the presence of electromagnetic excitation; the excitation, for example by an optical wave, acts on the electronic energy levels in the material (typically a semiconductor doped with metal) if the latter has an appropriate energy structure. These surface waves have a short propagation distance, of the order of a few tens of nanometers. If such a layer is associated with physical marks in an information storage medium, the surface waves will be disturbed by these marks and they can interact with an optical beam in order to return a remote-field optical signal to the detectors of the reading system which will make it possible to read this information.

In order to create the surface plasmons which will thus reinforce the optical return signal modulated by the physical marks of the storage medium, the laser reading beam will be given an elliptical polarization in TM predominant mode, favoring the excitation of surface plasmons in the region illuminated by the laser beam.

The physical marks can be of different natures. Most often they will be constituted by hollows and protrusions of a flat substrate, but they can also be constituted by local changes of optical index of a layer, or even by phase changes of a material (crystalline zones and amorphous zones for example).

The structure of the storage medium must therefore comprise, on the one hand, a substrate bearing physical marks carrying information and, on the other hand, on this substrate, the active layer is capable of bearing surface plasmons and a transparent dielectric layer which covers it.

The layer bearing the surface plasmons is a super-resolution active layer in the sense that the plasmons can be excited only if the energy structure of the layer has been modified by an energy contribution, and it is only in a small zone at the center of the laser beam that the power density is sufficient to cause this energy contribution. Thus, the surface plasmons will only be created in a zone having dimensions smaller than the dimension of the laser spot illuminating the layer. This will make it possible to read marks having dimensions smaller than the resolution of the optical reading system.

The possibility of excitation of surface plasmons is given by a local modification of the optical index of the active layer. In fact, in order to produce an excitation of surface plasmons, the layer must be such that its complex optical index n+i.k, in the place where the index is modified by the laser spot (at the center of the latter), satisfies the condition $k^2-n^2$ positive, the quantity $k^2-n^2$ furthermore being greater than the quantity $k_0^2-n_0^2$, where $(n_0, k_0)$ is the complex index of the material of the layer outside of the center of the laser beam, in that place where surface plasmons cannot be excited.

This condition on the indices makes the layer locally favorable for bearing surface plasmons on very small areas whose dimensions are smaller than the focal spot of the reading laser; the plasmons will therefore be able to be excited in very small areas because of the interaction between the material and the incident optical waves of the laser beam, polarized in TM predominant mode.

In the absence of these plasmons, the marks smaller than the limit resolution of the optical reading system diffract the beam and therefore transform a part of the incident optical beam into an evanescent wave which cannot propagate in remote field and which is therefore not detectable. In the presence of an excitation of plasmons, localized laterally at the center of the laser's focal spot, at the interface between the active super-resolution layer and the dielectric layer (transparent) which covers it, there is a local coupling between the plasmons and the evanescent waves resulting from the diffraction by the small marks; this coupling causes a remote-field diffraction of the light, consequently conveying an additional signal to the detector which would not have received any significant signal otherwise.

In order to obtain a TM dominant elliptical polarization, for the purpose of correctly exciting surface plasmons, provision is made for interposing in the reading system, between the focusing lens of the laser beam and the surface coating the stored information, a quarter-wave plate whose orientation is chosen for establishing a TM dominant polarization, unlike customarily where it is sought to establish a circular polarization with equal TE and TM components. The rotation of the quarter-wave plate is preferably between 0° and 45° with respect to the position in which it establishes a circular polarization (the angle being considered positively in the direction in which the TM component is favored and not in the reverse direction).

In a preferred embodiment, an angle of rotation of the quarter-wave plate of between 25° and 35° is chosen in order to maximize the average TM polarization over the cross-section of the laser beam. A preferred value of rotation is about 28 to 30°.

In a variant, it is considered that the polarization of the beam is not identical over the whole of the cross-section of the beam and the quarter-wave plate is subdivided into several juxtaposed elementary plates, each corresponding to apart of the cross-section of the beam, these elementary plates having angles of rotation chosen individually in order to reinforce the TM component for the part of the beam passing through that element, taking account of the incident polarization of that part of the beam. The orientations of the elementary plates are chosen in such a way as to obtain a TM predominant polarization over the whole of the cross-section of the beam emerging from the quarter-wave plate.

In brief, there is proposed according to the invention an optical method of reading information written in a high-density storage medium, characterized in that on the one hand, the information written in the storage medium is covered by an active layer having a first possible electronic energy state and a second possible electronic energy state, the layer being capable only in the second state of bearing surface plasmons generated by an illumination by a reading laser beam, this active layer being covered by a transparent dielectric layer, on the other hand, the optical reading is carried out using a laser source, focusing optics and means of polarization of the focused beam, the power density in a small zone at the center of the focused laser beam being sufficient to cause the active layer to change from the first state into the second energy state in such a way as to make it capable of bearing surface plasmons.

The polarization of the focused laser beam is TM predominant polarization so that the excitation of the plasmons is effective. The polarization means of the reading system are capable of establishing a TM predominant polarization of the laser beam.

The invention therefore relates to anew optical reading method which uses both a special recording medium and appropriate reading means. It also relates to the optical information storage medium which is suitable for this reading method and to an information reading system which is suitable for this reading method.

BRIEF DESCRIPTION OF THE DRAWINGS

Other features and advantages of the invention will appear on reading the following detailed description which is given with reference to the appended drawings in which.

DESCRIPTION OF PREFERRED EMBODIMENTS

For a better understanding of the invention, it is recalled that a surface plasmon is an evanescent wave which is established from the two sides of an interface separating two layers. It is an exponentially decreasing wave: its amplitude decreases exponentially with the distance from the interface.

Surface plasmons are solutions to the propagation equations of electromagnetic waves. The wave vector has two real components, corresponding to the propagation of the wave along the interface and an imaginary component which defines the exponential decrease from the two sides of the interface.

Surface plasmons are excited by an electromagnetic coupling between an optical wave having a TM type polarization and the medium into which this wave penetrates at the interface.

Figure 1:
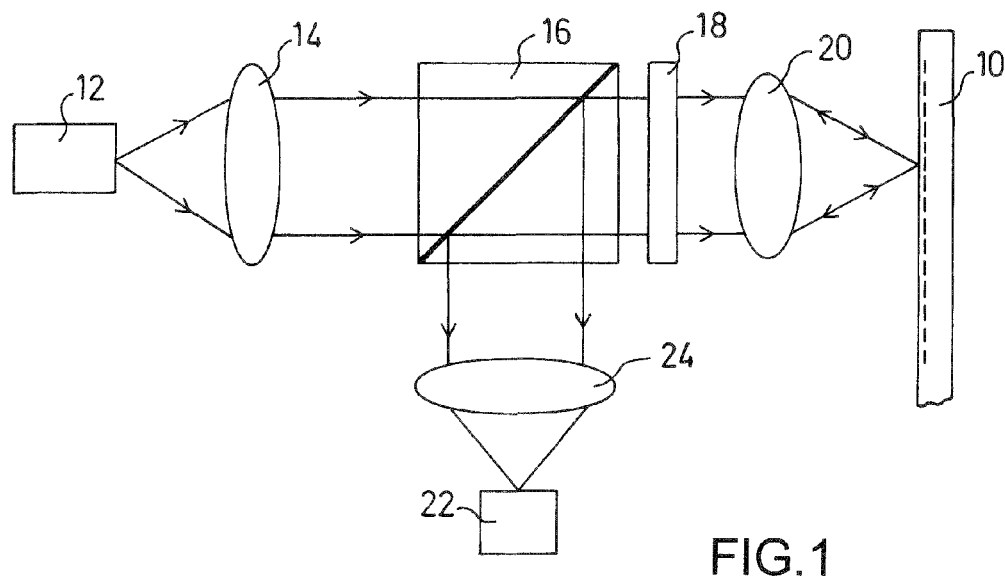
FIG. 1 shows the general structure of an optical information reader.

FIG. 1 recalls the general principle of reading optical information. The information is physical marks on a medium which is generally a rotating disk 10 moving under the focusing zone of a laser beam.

A laser source 12, for example a laser diode, produces a beam which is collimated by collimation optics 14. The parallel, collimated beam is directed towards a prism for separating polarizations 16. The prism 16 is a polarizing prism which allows the beam to pass whilst giving it a linear polarization with a fixed orientation of the polarization vector. The beam thus linearly polarized passes into quarter-wave plate 18 before being projected by focusing optics 20 onto the information medium 10.

The quarter-wave plate is conventionally oriented in such a way as to produce a circular polarization from the linear polarization which it receives. Consequently the laser beam leaving the quarter-wave plate 18 has balanced TM and TE components.

The return beam resulting from the reflection on the information medium returns through the optics 20 with a circular polarization but of opposite sign to that of the incident beam. The beam passes through the quarter-wave plate again and at the output it again has a linear polarization, perpendicular to that of the incident beam on the plate. The reflected beam then again enters the separation prism 16; the beam, polarized at 90° to the incident beam, does not pass through the prism again towards the source but it is deflected by the separation prism towards a signal detector 22, onto which it is focused by optics 24.

It will be seen that in the invention the quarter-wave plate 18 is rotated through an angle different from that which makes it possible to obtain a circular polarization. On the contrary, it is rotated in such a way as to obtain a TM dominant polarization.

Figure 2:
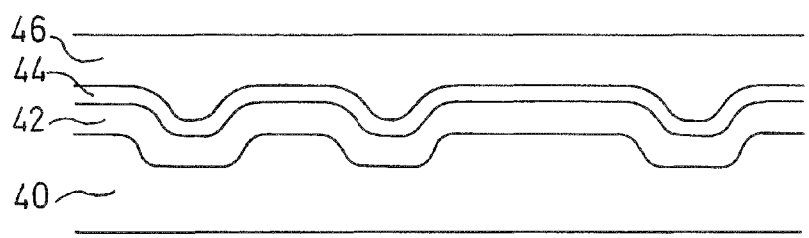
FIG. 2 shows the structure of an information storage medium according to the invention.

FIG. 2 shows the basic structure of a storage medium according to the invention. This structure comprises physical marks which define the stored information.

Typically the marks are hollows and protrusions formed for example by molding in the upper flat surface of a disk made of a material 40 such as polycarbonate. In a conventional disk, these marks could be covered by a layer of reflecting aluminum.

Other types of marks could be provided; in particular marks constituted in a transparent layer by zones whose optical index is modified locally; this latter system is in particular usual for rewritable optical disks. Hereafter, for the purpose of simplification, it will be considered that the marks are hollows and protrusions formed by pressing.

The length of the marks in the direction of progress under the reading laser beam defines the written information. Some of the marks have dimensions smaller than the resolution of the optical reading system. Typically, if the storage system is intended to function with an approximately 400 nanometer blue reading laser, marks of length 100 nanometers will be able to be present in the medium (length measured in the direction of progress of the marks under the reading laser beam).

In the invention, the marks are covered by at least two layers which respectively are a layer 42, which will be called the "active layer", and a layer 44 made of transparent dielectric material. A transparent overall protective layer 46 can be provided above the dielectric layer 44. The illumination by the reading laser beam takes place from above.

The active layer is, according to the invention, a layer which has two different states with regard to its electronic energy structure. In a first state, the layer is not capable of bearing surface plasmons. In a second state, into which it is taken by an energy contribution from the reading laser beam, it is capable of bearing surface plasmons.

The change from the first energy structure state to the second state is caused by the laser beam, but the energy density of that laser beam (which is conventionally distributed in a Gaussian manner over a cross-section of the beam) is able to cause this change only in a small area, at the center of the laser beam, at the place where the power density is highest. Only a small area of the active layer at the center of the laser beam will have its energy structure modified sufficiently for it to become capable of bearing surface plasmons.

In the first state, the active layer has a complex propagation index $(n_0, k_0)$ or $n_0 + ik_0$ which does not allow the layer to bear surface plasmons. However, in the second state the active layer has its complex index modified and becomes $(n,k)$ such that the layer can bear surface plasmons. A condition for this to be so is that $k^2 - n^2$ is positive and greater than $k_0^2 - n_0^2$.

The materials which can thus react to the optical energy in order to become capable of bearing surface plasmons which they could not bear in their ordinary state are doped semiconductor materials. The III-V materials are well suited. Indium antimonide doped with a noble metal (Gold, Silver, Platinum) is a particularly suitable material. The doping can be from 1 atom in 1 million atoms, that is to say 0.0001%, up to 5% atomic (doping by co-spraying for example). The antimonide and the indium are in approximately equivalent atomic quantities.

The dielectric layer 44 which covers the active layer 42 can be a layer of silicon dioxide (silica) $SiO_2$, or of silicon nitride $Si_3N_4$ or a compound of zinc sulfide and silicon dioxide $ZnS\text{-}SiO_2$ in an atomic proportion of about 70 to 85% of zinc sulfide and the rest being silicon dioxide.

The thickness of the active layer 42 is preferably about 10 to 50 nanometers, preferably between 20 and 30 nanometers. The thickness of the dielectric layer 44 which covers it can be about 30 to 100 nanometers, preferably about 50 nanometers.

The active layer 42 is shown as being directly in contact with the hollows and protrusions of the polycarbonate substrate 40; it could also be sandwiched between two dielectric layers, one dielectric layer (not shown) similar to the layer 44 then being interposed between the substrate 40 and the active layer 42.

In order to favor the excitation of surface plasmons when the active layer is in its second energy state, provision is made for the polarization of the incident laser beam on the layer to be TM predominant. In order to do this, the quarter-wave plate 18 (FIG. 1) is rotated thorough an angle α with respect to the usual position it is given, that is to say the position which converts a determined linear polarization into a circular polarization where the TE waves are transmitted in the same proportion as the TM waves. The quarter-wave plate is a birefringent plate which has an index depending on the polarization of the light and which therefore acts on the light as a function of the incident polarization.

Figure 3:
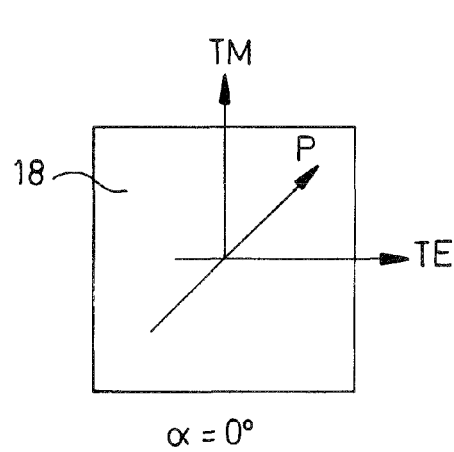
FIG. 3 is a symbolic representation of a birefringent quarter-wave plate.

FIG. 3 is a symbolic representation of the quarter-wave plate seen from the front in a usual position where α=0: the polarization directions favored by the plate are denoted by TE and TM. The incident direction of polarization on the plate, that is to say the linear polarization given to the beam by the prism 16, is represented by the vector P. This vector is at 45° to the directions of polarization favored by the birefringent plate, such that the light is divided in a balanced manner between the two polarization components TM and TE.

Figure 4:
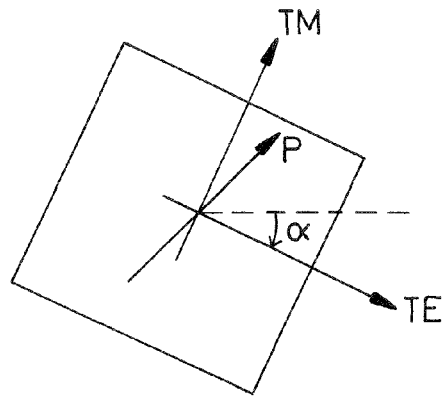
FIG. 4 shows a rotation of the quarter-wave plate through an angle α.

FIG. 4 shows the configuration according to the invention in which the quarter-wave plate is rotated through a non-zero angle α, of the order of 30°, the direction of polarization represented by the vector P not having changed (the prism 16 has remained fixed and therefore still provides the same polarization vector P). The quarter-wave plate 18 will allow more of the TM polarization component and less of the TE polarization component to pass (without however eliminating the TE component which participates in obtaining a return signal).

The angle of rotation can be chosen within a wide range (between 5° and 40°, the preferred angle being about 30°).

On rotating the quarter-wave plate, it is observed that the shape of the laser beam becomes more elliptical, the energy distribution of the beam being sensitive to the polarization when working with a large numerical aperture; things are arranged such that the small axis of the ellipse is orientated in the direction of progress of the marks under the laser beam, which improves the reading quality.

The reading laser powers used in order to obtain the sought effects are of the order of 1.20 to 1.40 milliwatts.

The measurements taken on samples bearing 100 nanometer or 80 nanometer marks and using reading powers of 1.35 milliwatts and 1.25 milliwatts respectively at a blue wavelength of 405 nanometers, showed that the error rate improved by a factor 2 when the quarter-wave plate was rotated from the 0° position to a position of 28° and using an identical measuring method.

In a variant embodiment, it is considered that the polarization of the incident wave is not uniform over the whole of the cross-section of the beam and the quarter-wave plate having two principal directions of refringence is replaced by a juxtaposition of quarter-wave plates having principal directions of refringence which are not all the same. Each plate acts on a portion of the cross-section of the beam. The individual directions are chosen in order to obtain a dominant polarization of the TM type at the output of the plate in all of the zones of the cross-section of the beam. It is thus possible to interpose, between the polarizer cube and a quarter-wave plate of uniform orientation, a half-wave plate constituted by several juxtaposed half-wave plates having different neutral axes each acting on a portion of the cross-section of the laser beam. For example, the half-wave plate is formed of four sectors juxtaposed in a plane, having respective neutral axes of different orientation, two adjacent sectors having neutral axes oriented at 45° to each other.

Figure 5:
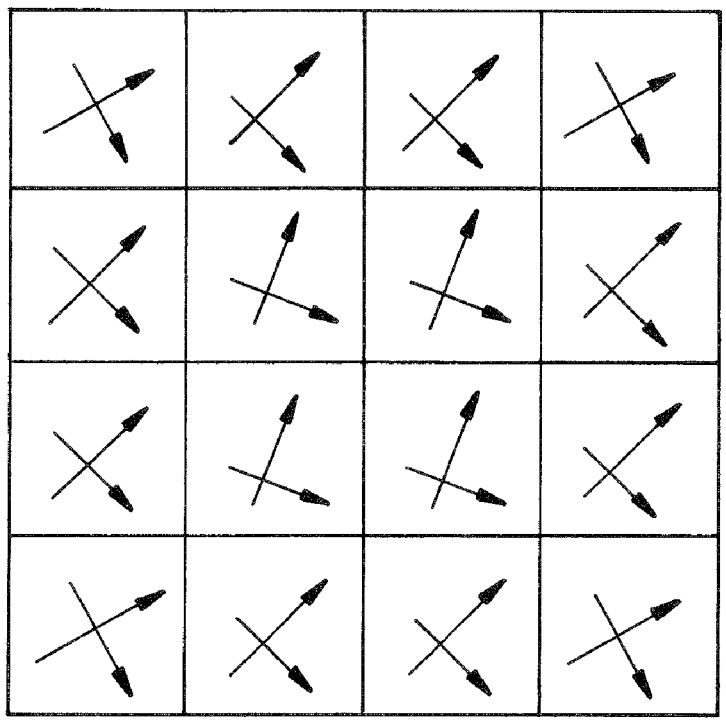
FIG. 5 shows a birefringent plate composed of several juxtaposed plates.
Figure 5:
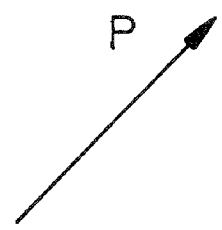

FIG. 5 shows, in a magnified view, a plate formed by such a juxtaposition of plates. The individual directions of birefringence of each plate are symbolized by two orthogonal arrows, in the same way as in FIGS. 3 and 4. The plate is shown with an overall orientation which optimizes the transmission of the TM mode when the mean polarization vector P of the incident light is oriented as indicated in the figure.

The analog signal resulting form reading these marks in super-resolution will be subjected to signal processing sufficiently adapted for reading very small and very close marks. Typically a processing of the PRML (Partial Response—Maximum Likelihood) type will be used, which consists in:

making a theoretical estimate of the response shapes which the output signal of the information processing channel can assume when this channel receives different models of binary information successions (Partial Response PR); the whole of the processing chain (from writing to reading) which progresses from a succession of binary information that is desired to be stored in the storage medium to the retrieval of an analog signal resulting from the reading of that binary information in the medium, having passed through the writing of physical marks in the medium;

and making a comparison between the output signal actually detected and the different theoretical response shapes in order to determine which is the succession of binary information which has most probably been transmitted to the input of the channel in order to give this output signal (Maximum Likelihood).

The invention claimed is:

1. An optical method of reading information written in a high-density storage medium, wherein the information written in the storage medium is covered by an active layer having a first possible electronic energy state and a second possible electronic energy state, the active layer being capable only in the second electronic energy state of bearing surface plasmons generated by an illumination by a reading laser beam, this active layer being covered by a transparent dielectric layer, said active layer being a doped semiconductor layer having a first complex optical index in the first electronic energy state which differs from a second complex optical index in the second electronic energy state, the method comprising:
    a. producing a laser beam;
    b. focusing the laser beam on the active layer;
    c. polarizing the focused beam;
    d. wherein the power density in a small zone at the center of the focused laser beam is sufficient to cause the active layer to change from the first electronic energy state into the second electronic energy state in such a way as to make it capable of bearing surface plasmons;
    e. wherein a real part n and an imaginary part k of the complex optical index n+ik in the second electronic energy state being such that $k^2-n^2$ is positive; and
    f. wherein the polarization provides the laser beam with a TM predominant polarization mode.

2. The method as claimed in claim 1, wherein the polarization comprises a quarter-wave birefringent plate oriented at a non-zero angle alpha with respect to a reference orientation which would provide the laser beam with a circular polarization.

3. The method as claimed in claim 2, wherein the angle alpha is between 25° and 35°.

4. The reading method as claimed in claim 1, wherein the active layer is made of indium antimonide doped with gold, silver or platinum.

5. The reading method as claimed in claim 4, wherein the doping is between 0.0001% and 5% in atomic proportions.

6. A system for the optical reading of information stored in a storage medium comprising a laser source, focusing optics for forming a focused beam, and means of polarization of the focused beam, the power density in a small zone at the center of the focused laser beam being sufficient to cause an active layer of the storage medium to change from its a first electronic energy state to a second electronic energy state in such a way as to make it capable of bearing surface plasmons, the polarization means being capable of polarizing the laser beam in TM predominant mode, said active layer being a doped semiconductor layer having a first complex optical index in the first electronic energy state which differs from a second complex optical index in the second electronic energy state.

7. The optical reading system as claimed in claim 6, wherein the polarization means comprise a linear polarization prism and, downstream of the prism, a quarter-wave birefringent plate rotated through an angle of about 25 to 35° with respect to a reference orientation which would circularly polarize the laser beam leaving the prism.

8. The optical reading system as claimed in claim 6, wherein the polarization means comprise a linear polarization prism and a set of juxtaposed birefringent quarter-wave plates, oriented in such a way as to impart a TM predominant polarization to the portion of laser beam passing through it.

9. A system according to claim 6, wherein a real part n and an imaginary part k of the complex optical index n+ik of the active layer in the second electronic energy state is such that $k^2-n^2$ is positive.

10. A system according to claim 7, wherein a real part n and an imaginary part k of the complex optical index n+ik of the active layer in the second electronic energy state is such that $k^2-n^2$ is positive.

11. A system according to claim 8, wherein a real part n and an imaginary part k of the complex optical index n+ik of the active layer in the second electronic energy state is such that $k^2-n^2$ is positive.

* * * * *